United States Patent
Pulsipher (10) Patent No.: US 7,307,962 B2
(45) Date of Patent: Dec. 11, 2007

(54) SYSTEM FOR INFERENCE OF PRESENCE OF NETWORK INFRASTRUCTURE DEVICES

(75) Inventor: Eric A Pulsipher, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 890 days.

(21) Appl. No.: 09/796,708

(22) Filed: Mar. 2, 2001

(65) Prior Publication Data

US 2002/0124079 A1    Sep. 5, 2002

(51) Int. Cl.
H04L 12/28    (2006.01)
(52) U.S. Cl. .................. 370/254; 370/401; 709/220
(58) Field of Classification Search ............. 370/230, 370/236, 236.1, 236.2, 252, 254, 255; 709/202, 709/220, 223, 224, 225
See application file for complete search history.

(56) References Cited

U.S. PATENT DOCUMENTS

| | | | | |
|---|---|---|---|---|
| 5,319,363 A * | 6/1994 | Welch et al. | ........... | 340/825.36 |
| 5,546,540 A * | 8/1996 | White | ........... | 709/223 |
| 5,675,741 A * | 10/1997 | Aggarwal et al. | ........... | 709/242 |
| 5,961,597 A * | 10/1999 | Sapir et al. | ........... | 709/224 |
| 6,108,702 A * | 8/2000 | Wood | ........... | 709/224 |
| 6,172,980 B1 * | 1/2001 | Flanders et al. | ........... | 370/401 |
| 6,225,999 B1 * | 5/2001 | Jain et al. | ........... | 715/734 |
| 6,377,987 B1 * | 4/2002 | Kracht | ........... | 709/220 |
| 6,397,248 B1 * | 5/2002 | Iyer | ........... | 709/223 |
| 6,405,248 B1 * | 6/2002 | Wood | ........... | 709/223 |
| 6,704,292 B1 * | 3/2004 | Valentine et al. | ........... | 370/255 |
| 6,791,949 B1 * | 9/2004 | Ryu et al. | ........... | 370/254 |
| 6,795,846 B1 * | 9/2004 | Merriam | ........... | 709/203 |
| 6,874,021 B1 * | 3/2005 | Liu et al. | ........... | 709/223 |
| 2002/0087335 A1 * | 7/2002 | Meyers et al. | ........... | 705/1 |
| 2002/0152311 A1 * | 10/2002 | Veltman et al. | ........... | 709/227 |

* cited by examiner

*Primary Examiner*—Chi Pham
*Assistant Examiner*—Shick Hom (57) ABSTRACT

A device discovery module of a network management software is utilized to discover the presence of layer-2 network devices. When enabled by a command from the network management software, the device discovery module may be configured to query or poll all network devices for information. The device discovery module may be configured to seek address information from an address resolution protocol ("ARP") cache of a queried network device. The ARP cache may contain addresses, e.g., layer-2 address, of other network devices contacted by the queried network device. The device discovery module may be further configured to retrieve from the queried network device the port type and port configuration. After retrieving the address information, the device discovery module organizes the address information in an ordered list starting with the identified port of a network device and address information detected on the identified port. If the identified port has been identified as a single point-to-point connection, and there are multiple address detected on that port, this is an inference that there is a device connecting the remote device of the identified port with the devices of each address heard. Otherwise, if the identified port has been identified as a single point-to-point connection, and there is only one address detected, this is an inference that there are no intervening devices.

15 Claims, 6 Drawing Sheets

| DEVICE NAME | CONNECTION TYPE | PORT NUMBER | ADDRESS INFORMATION |
|---|---|---|---|
| A | NS | 1 | C |
| A | NS | 1 | D |
| D | NS | 1 | A |
| C | NS | 1 | A |

FIG. 6

SYSTEM FOR INFERENCE OF PRESENCE OF NETWORK INFRASTRUCTURE DEVICES

TECHNICAL FIELD

The invention relates to management of a network. More particularly, the invention relates to improving the detection of layer-2 remote devices in a network to obtain an accurate depiction of the network.

DESCRIPTION OF THE RELATED ART

Network communications have become a fundamental part of today's computing. It is not uncommon to find two or more computer systems operating together to resolve computing issues such as simulations, modeling, forecasting, etc. In fact, networked computer systems working together have been so successful, users have been inclined to design and implement substantially larger networks.

As networks grow larger, become increasingly complex, and interface with a variety of diverse networks, it is the task of a network manager (or administrator or user) to keep track of the devices on the networks, to monitor performances and load, and to diagnose and correct problems with the network.

To assist a network manager, network management software may be used in the management of a network. Conventional network management software typically executes on a management device or node of the network. From the management node, the conventional network management software may be configured to determine a network topology, detect malfunctioning remote network devices or communication links, monitor network traffic, etc.

As part of the management duties, a network management software may be used to determine a topology or map of a managed network. Typically, a network manager may enable a discovery function of the network management software to detect connected devices on the managed network. For example, a management node executing the conventional network management software may initiate a "ping sweep" to discover devices. In the "ping sweep", the management node may put out a message with an address and wait for a response from the address. If there is a response, a network device exists for the address. The management node typically executes the "ping sweep" for a range of addresses.

However, the "ping sweep" may be applicable if the remote devices have Internet protocol (IP) addresses. An IP address of a network device identifies a particular network on the Internet and an identifier of the network device within the particular network. For nomenclature, an IP address may be considered as a layer-3 address.

Often, in a network, not all of the network devices have a layer-3 address. For example, a repeater or a hub may not require a layer-3 address, since they function more as a relay than as a source or destination for network traffic. Typically, repeaters and hubs each have a layer-2 address, which may be defined as a physical address of a device within a network. Accordingly, a "ping sweep" may not be able to discover a network device with a layer-2 address.

Moreover, as new network devices are added to a network, a new device may often be put into an environment with existing network devices, which may or may not have advanced management capabilities. A network manager of the network may attempt to map the topology of the network to understand how the various network devices are connected and use the map to assist in resolving problems within the network. However, since not all the network devices have the same level of management capabilities, e.g., layer-3 addressing, often older network devices are omitted or placed in the wrong configuration. Alternatively, a network management software may not be able to discover network devices, because a network device may have restricted access, mis-configuration of a network device, mis-inventoried network device, etc.

SUMMARY OF THE INVENTION

In accordance with the principles of the present invention, a method for determining network topology includes querying a plurality of remote devices for layer-2 address information. The layer-2 address information is configured to provide at least one detected layer-2 address for each remote device of the plurality of remote devices. The method further includes inferencing an intermediate device in response to an identification of a plurality of detected layer-2 addresses for one remote device of the plurality of remote devices.

One aspect of the present invention provides for a method of managing a network. The method includes receiving a command where the command is configured to determine a configuration of said network. The method further includes polling a plurality of remote devices for layer-2 address information, the layer-2 address information configured to provide at least one detected layer-2 address by each remote device of the plurality of remote devices, and determining an intermediate device in response to an identification of a plurality of detected layer-2 addresses for one remote device of the plurality of remote devices.

Another aspect of the present invention provides for a system for determining a network topology. The system includes at least one processor, a memory coupled to at least one processor, and a network management software residing in said memory and executing on at least one processor. The network management software is configured to query a plurality of remote devices for layer-2 address information. The layer-2 address information is configured to provide at least one detected layer-2 address for each remote device of the plurality of remote devices. The network management software is further configured to inference an intermediate device in response to an identification of a plurality of detected layer-2 addresses for one remote device of the plurality of remote devices.

Additional advantages and novel features of the invention will be set forth in part in the description which follows and in part will become apparent to those skilled in the art upon examination of the following or may be learned by practice of the invention.

DESCRIPTION OF THE DRAWINGS

Features and advantages of the present invention will become apparent to those skilled in the art from the following description with reference to the drawings, in which.

DETAILED DESCRIPTION OF THE PREFERRED EMBODIMENTS

For simplicity and illustrative purposes, the principles of the present invention are described by referring mainly to an exemplary embodiment thereof. Although the preferred embodiment of the invention may be practiced as a software system, one of ordinary skill in the art will readily recognize that the same principles are equally applicable to, and can be implemented in, a hardware system, and that any such variation would be within such modifications that do not depart from the true spirit and scope of the present invention.

In accordance with the principles of the present invention, a device discovery module of a network management software is utilized to discover the presence of layer-2 network devices. When enabled by a command from the network management software, the device discovery module may be configured to query or poll all network devices for information. The device discovery module may be configured to query address information from an address resolution protocol (37 ARP") cache or a management information base ("MIB") database of a remote network device of a plurality of remote network devices. The ARP cache (or MIB database) may contain addresses, e.g., layer-2 addresses of other network devices contacted by the queried network device. The device discovery module may be further configured to retrieve from the queried network device the port type and port configuration. After retrieving the address information, the device discovery module organizes the address information in an ordered list starting with the identified port of a network device and address information detected on the identified port.

If the identified port has been identified as a single point-to-point connection, and there are multiple addresses detected on that port, there may be an inference that there is a layer-2 only addressable device connecting the remote network device of the identified port with the devices of each address heard. Otherwise, if the identified port has been identified as a single point-to-point connection, and there is only one address detected, this is an inference is made that there are no intervening devices.

Figure 1:
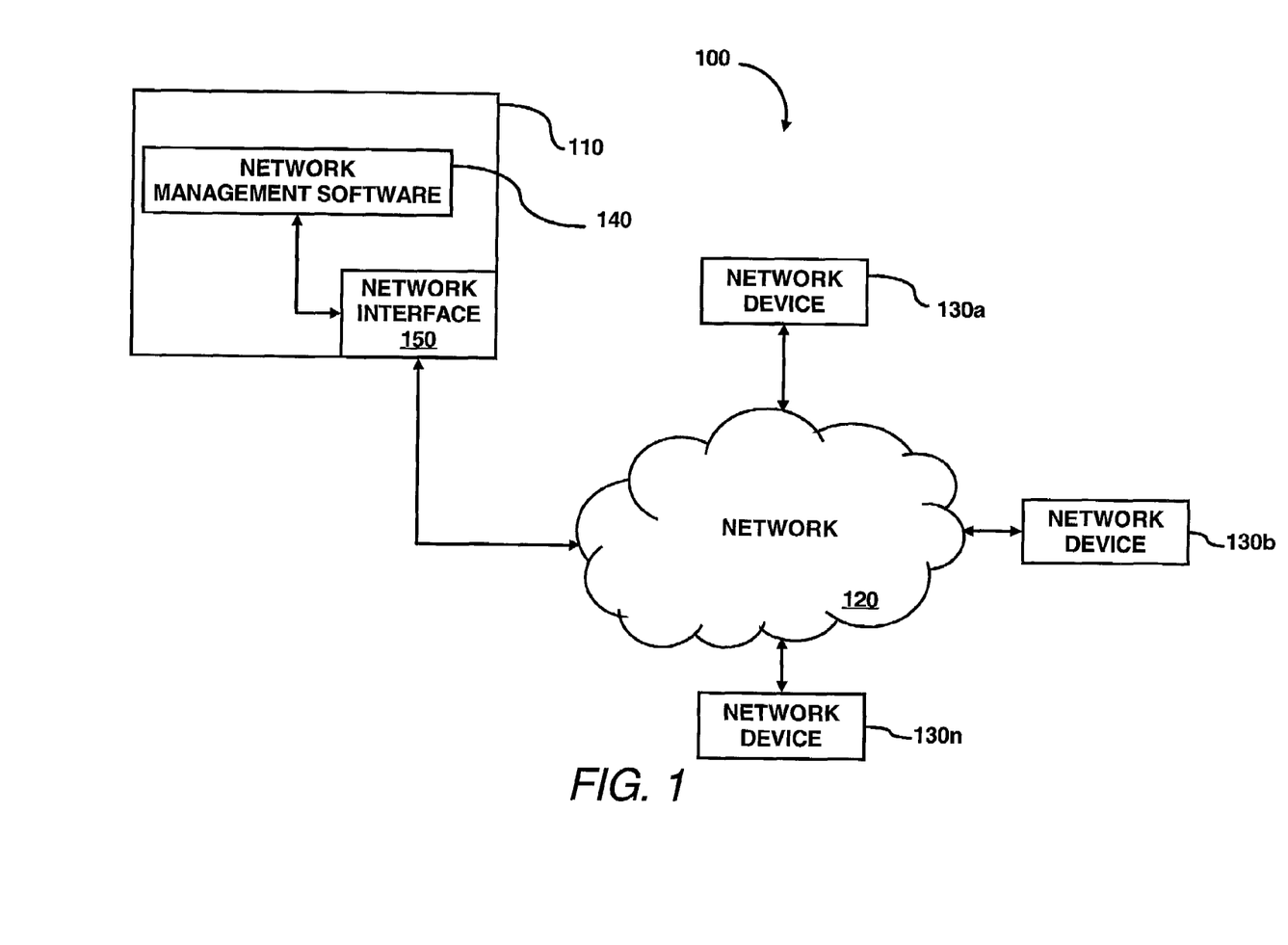
FIG. 1 illustrates a block diagram of a computer network in which an embodiment of the present invention may be implemented.

FIG. 1 illustrates a block diagram of a computer network 100 in which an embodiment of the present invention may be implemented. In particular, the computer network 100 includes a management node 110, a network 120 and network devices 130a. . . 130n. The management node 110 may be configured to provide a network manager with the capability to monitor and maintain the network 120 with the connected network devices 130a. . . 130n.

The network 120 may be configured to provide a communication path between the management node 110 and the network devices 130a. . . 130n. The network 130 may include a wide area network, a local area network, a wireless network, etc.

The network devices 130a. . . 130n may be any type of device that may be configured to interface with the network 120. The type of devices may include a printer, a facsimile, a personal computer, a client, a server, etc. The network devices 130a. . . 130n may be further configured to have at least a layer-2 address, e.g., a media access control ("MAC") address. However, a network device may be further configured to concurrently be addressable by other address levels, e.g., a layer-3 address.

The management node 110 may be further configured to include network management software 140 and a network interface 150. The network management software 140 may be configured to provide the management node with the capability to monitor and maintain the network 120 through the network interface 150. The network management software 140 may be further configured to discover unmapped layer-2 addressable network devices interfaced with the network 120. The network interface 150 may be configured to provide a communication interface between the management node 110 and the network 120. Accordingly, a network manager of the network management software 110 may be able to detect layer-2 network devices that had previously been undetected by conventional network management software.

Figure 2:
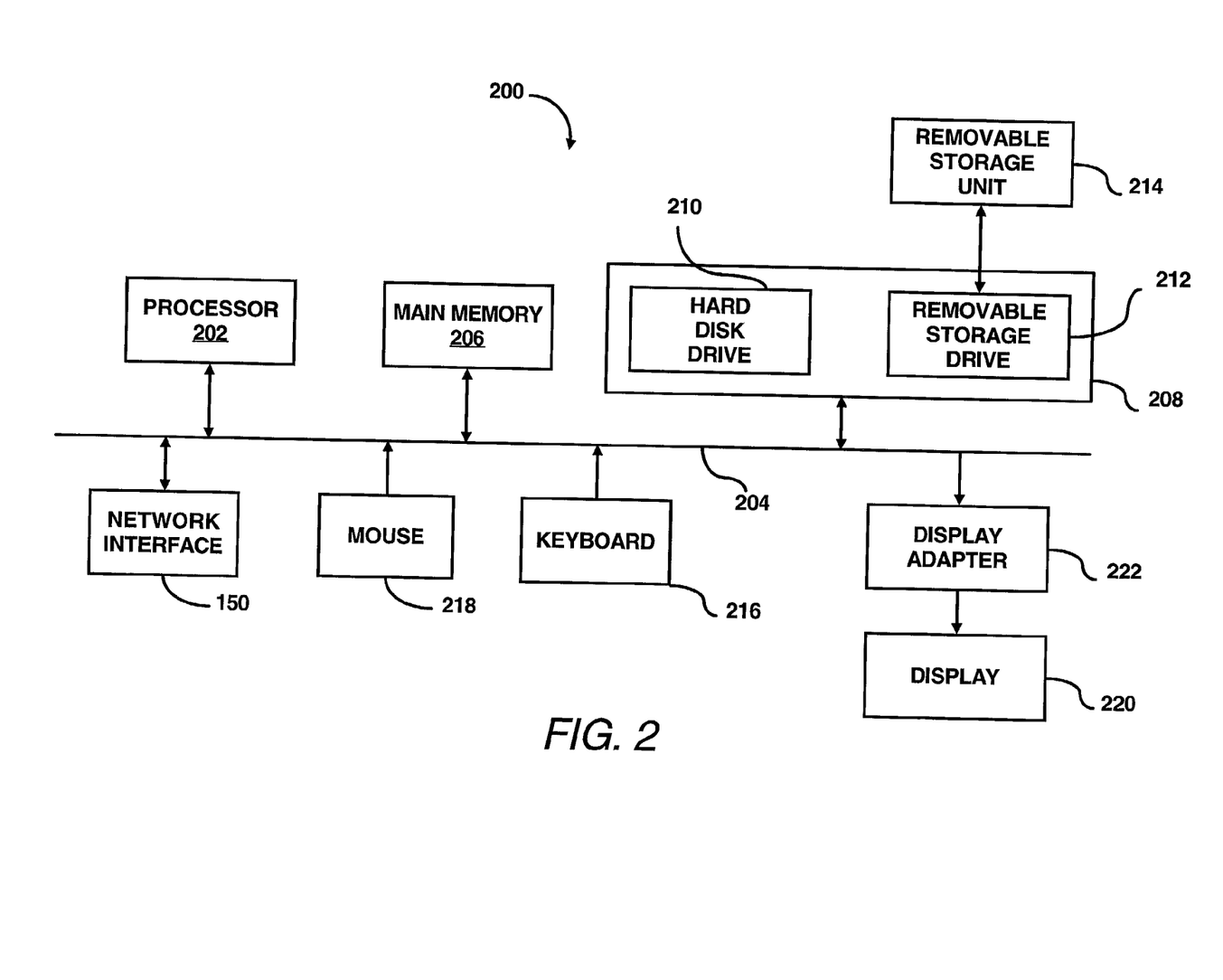
FIG. 2 illustrates an exemplary computer system in which an exemplary embodiment of the present invention may be implemented.

FIG. 2 illustrates an exemplary computer system 200 in which an exemplary embodiment of the present invention may be implemented. The functions of the network management software 140 are implemented in program code and executed by the computer system 200. In particular, the computer system 200 includes one or more processors, such as processor 202 that provides an execution platform for the network management software 140. Commands and data from the processor 202 are communicated over a communication bus 204. The computer system 200 also includes a main memory 206, preferably Random Access Memory (RAM), where the software for the network management software 140 is executed during runtime, and a secondary memory 208. The secondary memory 208 includes, for example, a hard disk drive 210 and/or a removable storage drive 212, representing a floppy diskette drive, a magnetic tape drive, a compact disk drive, etc., where a copy of software for the network management software 140 may be stored. The removable storage drive 212 reads from and/or writes to a removable storage unit 214 in a well-known manner. A network manager interfaces with the network management software 140 with a keyboard 216, a mouse 218, and a display 220. The display adaptor 222 interfaces with the communication bus 204 to receive display data from the processor 202 and converts the display data into display commands for the display 220. The network interface 150 provides a communication interface between the management node 110 and the network 120.

Figure 3:
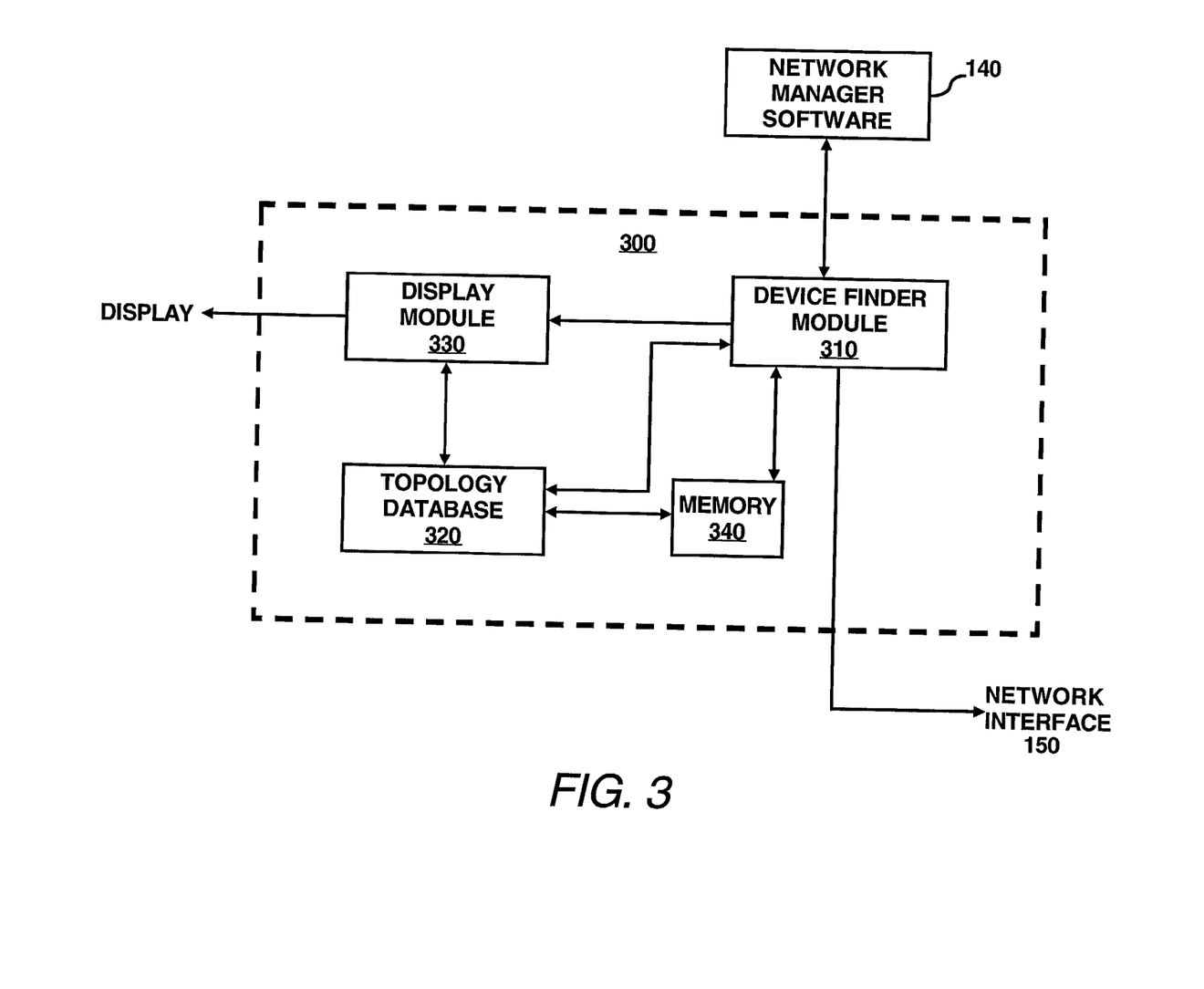
FIG. 3 illustrates a software architecture of an embodiment of a device finder module according to the principles of the present invention.

FIG. 3 illustrates a software architecture of an exemplary embodiment of a device discovery module 300 of the network management software 140 according to the principles of the present invention. In particular, the device discovery module 300 may be configured to discover unmapped layer-2 addressable network devices interfaced with the network 120. The device discovery module 300 may be further configured to discover the unmapped layer-2 addressable network devices in response to a command from the network manager software 140. The device discovery module 300 may include at least a device finder module 310, a topology database 320, and a display module 330.

The device finder module 310 is configured to poll or query all known network devices for port information and address information, e.g., addresses of other network devices, associated with each port. The known network devices may have been initially determined by using conventional methods of discovery. A polled network device may store the port information and address information in a MIB database contained within the polled network device.

Alternatively, the address information relating to detected addresses by the polled network device may be stored in an ARP cache of the polled network device.

The device finder module 310 is further configured to store the retrieved information from the remote network devices in a memory 340. The retrieved information may be stored in a tabular format, a linked list format, etc.

The device finder module 310 is further configured to interface with a topology database 320. The topology database 320 may be configured to receive discovered network devices from the device finder module 310 and to store the location of the discovered network devices for later display by the display module 330.

The device finder module 310 is further configured to determine the presence of unmapped layer-2 only addressable network devices through an inference methodology. The device finder module 310 is configured to re-order (or sort) the retrieved information by remote device. For each remote device, the retrieved information is sorted again by port number.

From the ordered table, the inference methodology may infer the presence of an unmapped layer-2 only addressable device by detecting multiple addresses for a port that has been designated as a point-to-point connection. Otherwise, if the port has been designated as a multiple connection, the inference may not be valid. An example of the device discovery module in operation is detailed in FIG. 4.

Figure 4:
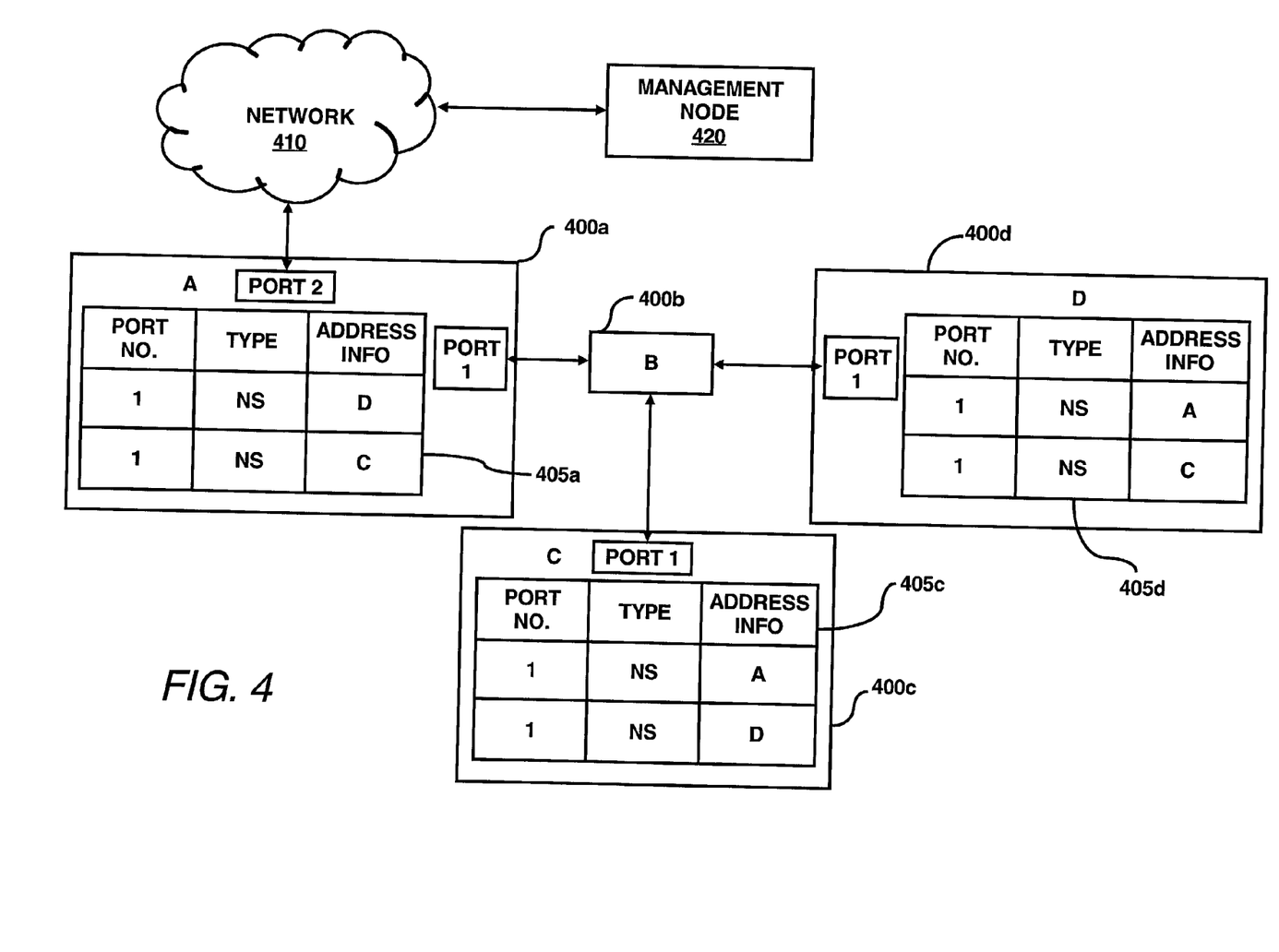
FIG. 4 illustrates a plurality of network devices interfaced with a network in which an embodiment of the present invention may be utilized.

FIG. 4 illustrates a plurality of network devices 400a... 400d interfaced with a network 410 in which an embodiment of the present invention may be utilized. In particular, the network device 400a is configured to interface with network device 400b. Network device 400b is configured to interface with network device 400c and network device 400d. The network devices, 400a, 400c, and 400d, are further configured to be layer-3 address capable, i.e., capable of performing layer-3 addressing. The network device 400b is further configured to be layer-2 address capable, i.e., capable of performing only layer-2 addressing.

The network devices, 400a... 400d, are further configured to interface with the network 410. The network 410 may be configured to provide a communication path between a management node 420 and the network devices 400a... 400d. The management node 420 may be configured to execute the network management software 140 and with an embodiment of the device discovery module 300 according to the principles of the present invention. Accordingly, using the network management software 140, the management node 420 may be further configured to discover unmapped layer-2 network devices.

The network devices 400a, 400c, and 400d are further configured to store address information relating to network device interaction. The address information may include a number of ports, type of connection for each port (i.e., point-to-point, also known as non-shared (NS)), shared, etc., detected addresses on each port, and the like. The network devices 400a, 400c, and 400d may be further configured to store the address information in an allocated memory, 405a, 405c, 405d, e.g., management information database, an address resolution protocol ("ARP") cache, etc., of each respective network device, 400a, 400c, and 400d. The address information may be stored as a table, a linked list, or the like.

A network manager may have initiated a conventional network discovery technique, e.g., a ping sweep, to discover network devices 400a, 400c and 400d. However, the network device 400b is configured to be only layer-2 addressable, and thus, conventional network discovery techniques would not discover network device 400b.

A network manager may utilize an embodiment of the present invention, e.g., a device discovery module, to discover network device 400b. The network manager may initiate a command from the network management software 140 to initiate the device discovery module 300. The command may be issued in response to a selection of the command from a menu bar on a graphical user interface of the network management software 140. Alternatively, the network management software 140 may be configured to provide a network manager a command line prompt to manually input the command.

As discussed herein above, the device discovery module 300 may be configured to poll or query each previously discovered or known network device 400a, 400c, and 400d, for the address information stored in the respective allocated memory 405a, 405c, and 405d. The device discovery module 300 may be configured to store the retrieved information in a memory location allocated to the device discovery module 300. The address information may be stored in a table, a linked list, or the like. The device discovery module 300 may be further configured to sort or order the table according to network device name and port number keys to create an ordered table 500, as shown in FIG. 5.

Figure 5:
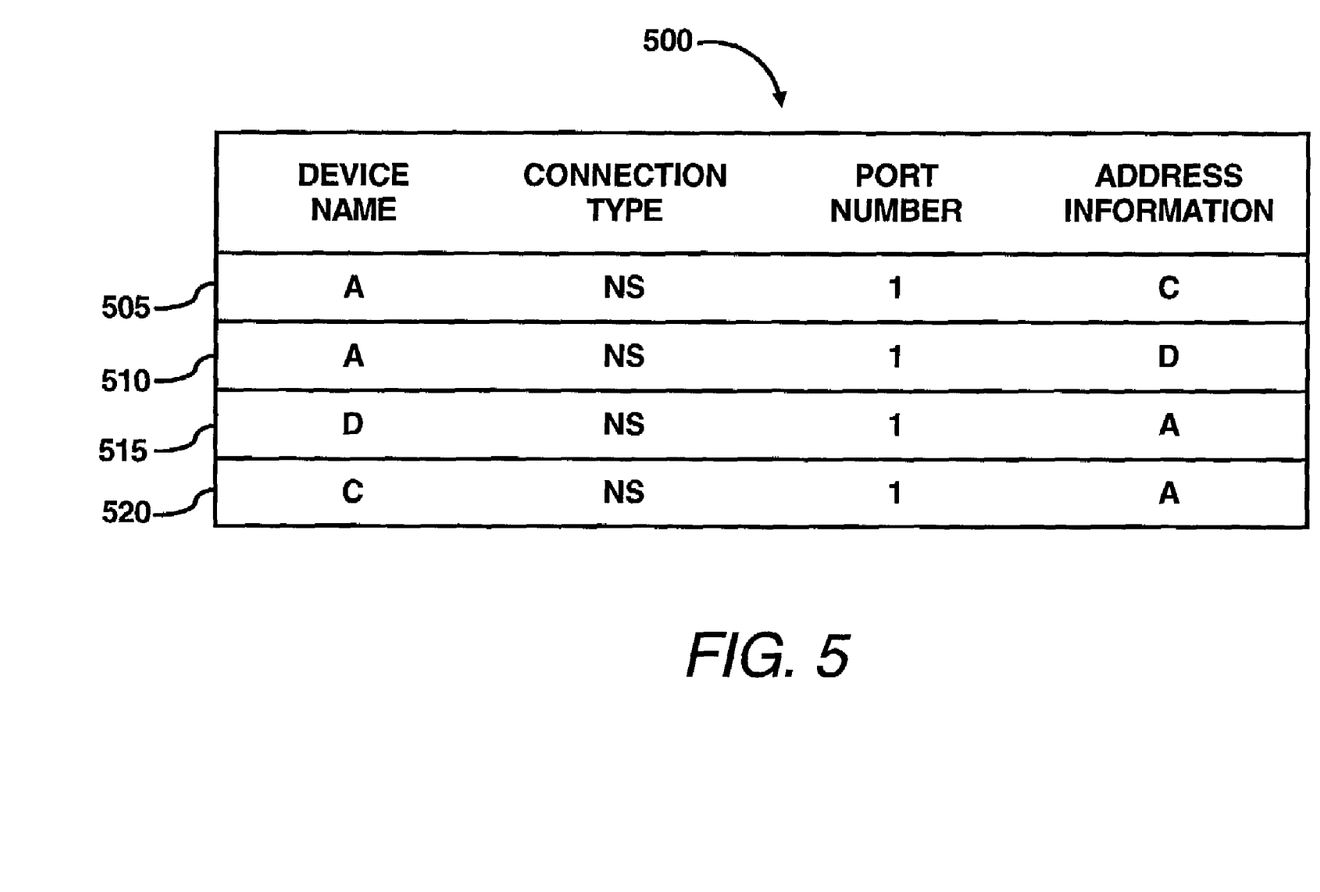
FIG. 5 illustrates an exemplary ordered table by an embodiment of the present invention.

FIG. 5 illustrates an ordered table 500 generated by the sorting of the stored address information according to an embodiment of the present invention. In particular, the ordered table 500 shows for network device A and port number one, that network device 400a detected the address of network device 400c and network device 400d, in rows 505 and 510, respectively. Furthermore, ordered table 500 shows for network device 400c and network device 400d, that they both detected the address of network device 400a, as shown in rows 515 and 520 respectively. Since, the port of network device 400a is known to be a point-to-point connection, there is an inference that there is an intermediate device 400b between the network devices 400a, 400c, and 400d. Accordingly, the device discovery module 300 may be further configured to add intermediate device 400b to the topology database 320 of the network management software 140.

Figure 6:
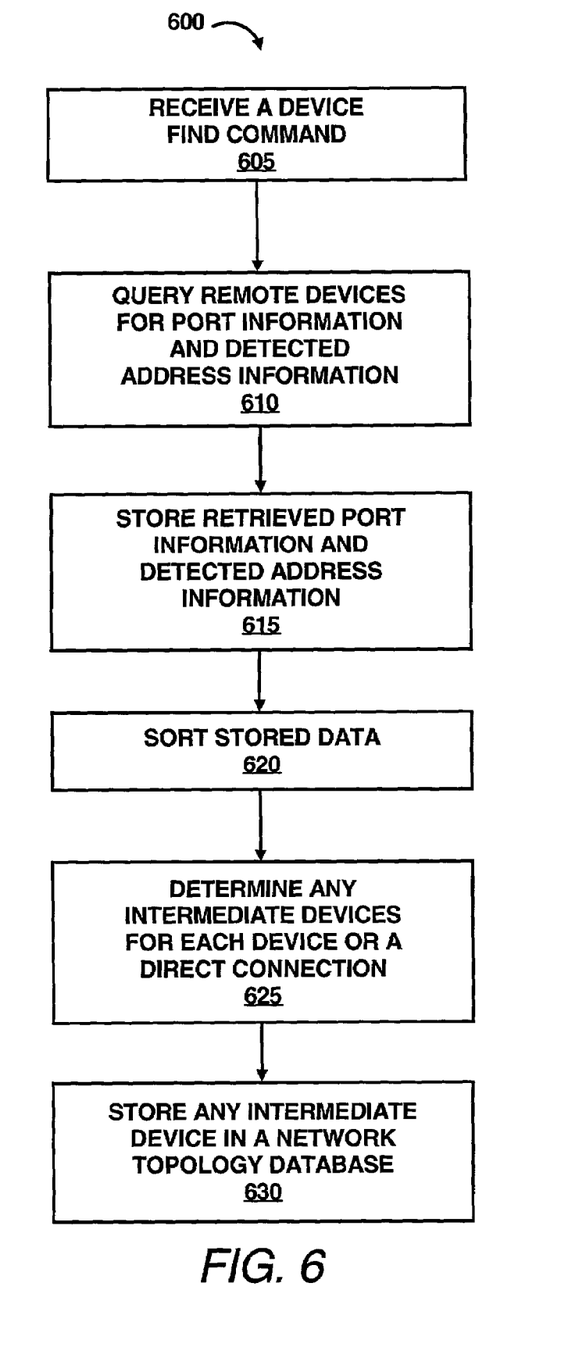
FIG. 6 illustrates a flow diagram of the device finder module shown in FIG. 3.

FIG. 6 illustrates an exemplary flow diagram 600 of the device discovery module 300 shown in FIG. 3 according to the principles of the present invention. In particular, the device discovery module 300 may be configured to receive a command configured to initiate a device discovery, in step 605.

In step 610, the device discovery module 300 may be further configured to query or poll known network devices for network information. For each network device, the network information may include the number of ports, the type of connection for each port, and addresses detected at each port.

In step 615, the device discovery module 300 may be further configured to store the retrieved network information in an allocated memory location. The network information may be stored in a tabular format, a linked list, or the like.

In step 620, the device discovery module 300 may be further configured to sort the stored network information according to network device and by port number. Subsequently, the device discovery module 300 may be further configured to determine if there are multiple addresses detected by a port configured to be point-to-point of a network device, in step 625. If there are multiple addresses detected for such a network device port, an intermediate device may be inferred. The location of the intermediate device in relative position to the known network device is stored in a topology database of the network management software 140, in step 630. The topology database may be adapted to provide information to other modules, e.g., the display module 320 of the network management software 140.

According to the disclosed embodiment, a device discovery module of a network management software is utilized to discover the presence of layer-2 network devices. When enabled by a command from the network management software, the device discovery module may be configured to query or poll all network devices for information. The device discovery module may be configured to seek address information from an ARP cache and/or a MIB database of a queried network device. The ARP cache and/or the MIB database may contain addresses, e.g., layer-2 addresses, of other network devices contacted by the queried network device. The device discovery module may be further configured to retrieve from the queried network device the port type and port configuration. After retrieving the address information, the device discovery module organizes the address information in an ordered list starting with the identified port of a network device and address information detected on the identified port. If the identified port has been identified as a single point-to-point connection, and there are multiple addresses detected on that port, this is an inference that there is a device connecting the remote device of the identified port with the devices of each address heard. Otherwise, if the identified port has been identified as a single point-to-point connection, and there is only one address detected, this is an inference that there are no intervening devices. Accordingly, a network manager may be provided the capability of detecting unmapped layer-2 addressable devices within a network, thereby providing better diagnostic and monitoring capability for the network manager.

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. In particular, although the method of the present invention has been described by examples, the steps of the method may be performed in a different order than illustrated or simultaneously. Those skilled in the art will recognize that these and other variations are possible within the spirit and scope of the invention as defined in the following claims and their equivalents.

What is claimed is:

1. A method for determining a topology of a network comprising:
    querying a plurality of known remote devices in the network for layer-2 address information, said layer-2 address information comprising layer-2 addresses detected at each port of said plurality of known remote devices;
    querying at least a first of said plurality of known remote devices for a type of connection for at least a first port of the first known remote device;
    inferring an unmapped remote device is physically connected to the first port of the first known remote device based on an identification that the first port has a point to point connection type and that the first port has detected a plurality of layer-2 addresses; and
    inferring a direct connection between a second and a third remote device of said plurality of known remote devices in response to an identification of a single detected layer-2 address of said third known remote device for one port of said second known remote device.

2. The method of claim 1,
    wherein querying at least a first of said plurality of known remote devices for a type of connection for at least a first port of the first known remote device comprises querying said plurality of known remote devices for port information, said port information comprising a type of connection for each port of each of said plurality of known remote devices; and wherein the method further comprises:
    storing in a memory said port information and said layer-2 address information for each of said plurality of known remote devices.

3. The method of claim 1, wherein querying said plurality of known remote devices for layer-2 address information comprises:
    querying an address resolution protocol cache of each of said plurality of known remote devices for said layer-2 address information.

4. A system for determining a network topology, comprising:
    at least one processor;
    a memory coupled to said at least one processor; and
    a network management software, residing in said memory and executing on at least one processor, configured to query a plurality of known remote devices in the network for a connection type for each port of said plurality of known remote devices and layer-2 address information, said layer-2 address information comprising layer-2 addresses detected at each port of said plurality of known remote devices, and to infer an unmapped remote device is physically connected to a first of said plurality of known remote devices based on an identification of a plurality of detected layer-2 addresses for a first port of said first remote devices and a determination that the first port of said first remote device has a point to point connection type; and wherein said network management software is further configured to infer a direct connection between a second and a third remote device of said plurality of known remote devices in response to an identification of a single detected layer-2 address of said third known remote device for one port of said second known remote device.

5. The system of claim 4, wherein: said network management software is further configured to query said plurality of known remote devices for port information, said port information comprising a type of connection for each port of each of said plurality of known remote devices, and to store in a memory said port information and said layer-2 address information for each of said plurality of known remote devices.

6. The system of claim 5, wherein:
    said network management software is further configured to query an address resolution protocol cache of each of said plurality of known remote devices for said layer-2 address information.

7. The method of claim 1, further comprising:
    receiving a command to determine a configuration of said network, wherein said querying a plurality of known remote devices for layer-2 address information is performed in response to said receipt of said command.

8. The method of claim 2, further comprising:
   displaying a network topology map including said known and unmapped remote devices in response to a second command to display said network topology map.

9. A method for determining a topology of a network comprising:
   querying a plurality of known remote devices in the network for layer-2 address information, said layer-2 address information comprising layer-2 addresses detected at each port of said plurality of known remote devices;
   querying said plurality of known remote devices for port information, said port information comprising a type of connection for each port of each of said plurality of known remote devices;
   storing in a memory said port information and said layer-2 address information for each of said plurality of known remote devices;
   grouping said port information and said layer-2 address information for each remote device of said plurality of remote devices; and
   inferring an unmapped remote device is physically connected to a first of said plurality of known remote devices based on an identification of a plurality of detected layer-2 addresses for a first port of said first remote device and a determination that the type of connection for the first port of said first remote device is a point to point connection type.

10. The method of claim 9, wherein grouping said port information and said layer-2 address information for each remote device of said plurality of remote devices comprises:
   organizing said port information and said layer-2 address information in an ordered list starting with ports of said each remote device and said layer-2 address information detected on each of said ports.

11. The system of claim 4, wherein said network management software is further configured to receive a command to determine a configuration of said network, wherein said network management software queries a plurality of known remote devices for layer-2 address information is performed in response to said receipt of said command.

12. The system of claim 4, wherein said network management software is further configured to display a network topology map including said known and unmapped remote devices in response to a second command to display said network topology map.

13. A system for determining a network topology, comprising:
   at least one processor;
   a memory coupled to said at least one processor; and
   a network management software, residing in said memory and executing on at least one processor, configured to query a plurality of known remote devices in the network for layer-2 address information, said layer-2 address information comprising layer-2 addresses detected at each port of said plurality of known remote devices;
   wherein said network management software is further configured to query said plurality of known remote devices for port information, said port information comprising a type of connection for each port of each of said plurality of known remote devices, and to store in a memory said port information and said layer-2 address information for each of said plurality of known remote devices;
   wherein said network management software is further configured to group said port information and said layer-2 address information for each remote device of said plurality of remote devices; and
   wherein said network management software is further configured to infer an unmapped remote device is physically connected to a first of said plurality of known remote devices based on an identification of a plurality of detected layer-2 addresses for a first port of said first remote devices and a determination that the first port of said first remote device has a point to point connection type.

14. The method of claim 13, wherein said network management software is further configured to organize said port information and said layer-2 address information in an ordered list starting with ports of said each remote device and said layer-2 address information detected on each of said ports.

15. A system for determining a network topology, comprising:
   means for querying a plurality of known remote devices in the network for a connection type for each port of said plurality of known remote devices and layer-2 address information, said layer-2 address information comprises layer-2 addresses detected at each port of said plurality of known remote devices; and
   means for inferring an unmapped remote device is physically connected to a first of said plurality of known remote devices based on an identification of a plurality of detected layer-2 addresses for a first port of said first remote device and a determination that the first port of said first remote device has a point to point connection type; and
   means for inferring a direct connection between a second and a third remote device of said plurality of known remote devices in response to an identification of a single detected layer-2 address of said third known remote device for one port of said second known remote device.

* * * * *

UNITED STATES PATENT AND TRADEMARK OFFICE
CERTIFICATE OF CORRECTION

PATENT NO. : 7,307,962 B2 Page 1 of 1
APPLICATION NO. : 09/796708
DATED : December 11, 2007
INVENTOR(S) : Eric A. Pulsipher It is certified that error appears in the above-identified patent and that said Letters Patent is hereby corrected as shown below:

On the Title page, in field (54), in "Title", line 2, delete "OF PRESENCE" before "INFRASTRUCTURE".

In column 1, line 2, delete "OF PRESENCE" before "INFRASTRUCTURE".

In column 3, line 29, delete "(37 ARP")" and insert --("ARP")--, therefor.

Signed and Sealed this

Twenty-fourth Day of June, 2008

JON W. DUDAS
*Director of the United States Patent and Trademark Office*